(12) United States Patent
Balasubramanian et al.

(10) Patent No.: US 10,546,058 B2
(45) Date of Patent: Jan. 28, 2020

(54) CREATING AND MODIFYING APPLICATIONS FROM A MOBILE DEVICE

(71) Applicant: Microsoft Technology Licensing, LLC, Redmond, WA (US)

(72) Inventors: Barath Balasubramanian, Bothell, WA (US); Evan Cohen, Seattle, WA (US); Olivier Colle, Bellevue, WA (US); Irina Koulinitch, Seattle, WA (US); Shrey Sangal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 14/936,601

(22) Filed: Nov. 9, 2015

(65) Prior Publication Data

US 2017/0132197 A1    May 11, 2017

(51) Int. Cl.
*G06F 17/00* (2019.01)
*G06F 17/24* (2006.01)
(Continued)

(52) U.S. Cl.
CPC .......... *G06F 17/248* (2013.01); *G06F 17/212* (2013.01); *G06F 17/2205* (2013.01); *G06F 17/2288* (2013.01); *H04W 4/50* (2018.02)

(58) Field of Classification Search
CPC ........ G06F 17/248; G06F 8/34; G06F 17/212; G06F 17/2205; G06F 17/2288;
(Continued)

(56) References Cited

U.S. PATENT DOCUMENTS 7,233,951 B1 *  6/2007  Gainer ................. G06F 17/246
7,784,030 B2    8/2010  Chrisffort et al.
(Continued)

FOREIGN PATENT DOCUMENTS

WO    2005026981 A1    3/2005

OTHER PUBLICATIONS

"International Search Report and Written Opinion Received for PCT Application No. PCT/US2016/060212", dated Feb. 24, 2017, 11 Pages.
(Continued)

*Primary Examiner* — Jason T Edwards

(57) ABSTRACT

Examples of the disclosure provide for modifying an application from a mobile device. An instruction to modify an application including one or more documents is received at the mobile device. It is determined at the mobile device whether the received instruction is associated with a first type of modification and/or a second type of modification. In response to determining that the received instruction is associated with the first type of modification, a local instance of the document stored at the mobile device is modified at the mobile device. In response to determining that the received instruction is associated with the second type of modification, a remote instance of the document stored at a server device is modified at the server device. Aspects of the disclosure enable a mobile device to strategically modify an application to facilitate managing local resources.

20 Claims, 7 Drawing Sheets

(51) Int. Cl.
*H04W 4/50* (2018.01)
*G06F 17/21* (2006.01)
*G06F 17/22* (2006.01)

(58) Field of Classification Search
CPC ...... G06F 16/951; G06F 16/958; G06F 9/547; G06F 9/5055; G06F 3/04847; G06F 17/30893; G06F 17/246; G06F 17/3089; G06F 17/30864; G06F 17/30011; G06F 17/30017; G06F 17/30165; H04W 4/001; H04W 4/50; G06Q 10/10
USPC .......................................... 715/229; 709/203
See application file for complete search history.

(56) References Cited

U.S. PATENT DOCUMENTS

| | | | |
|---|---|---|---|
| 7,813,910 B1 | 10/2010 | Poulin | |
| 7,890,926 B2 | 2/2011 | Balathandapani et al. | |
| 7,971,194 B1 | 6/2011 | Gilboa | |
| 8,136,109 B1 | 3/2012 | Birdeau et al. | |
| 8,589,955 B2 | 11/2013 | Roundtree et al. | |
| 8,694,954 B2 | 4/2014 | Ortiz | |
| 8,898,629 B2 | 11/2014 | Hirsch et al. | |
| 9,038,019 B2 | 5/2015 | Mau et al. | |
| 2002/0046235 A1* | 4/2002 | Foy .................. | G06F 17/24 709/203 |
| 2002/0073146 A1* | 6/2002 | Bauer ................ | G06F 9/547 709/203 |
| 2006/0129972 A1 | 6/2006 | Tyburski et al. | |
| 2007/0028166 A1* | 2/2007 | Hundhausen ...... | G06F 17/212 715/205 |
| 2008/0046557 A1 | 2/2008 | Cheng | |
| 2010/0174974 A1 | 7/2010 | Brisebois et al. | |
| 2010/0205436 A1 | 8/2010 | Pezeshki | |
| 2013/0086210 A1 | 4/2013 | Yiu et al. | |
| 2014/0033009 A1* | 1/2014 | Rein ................. | G06F 17/30011 715/212 |
| 2014/0101635 A1 | 4/2014 | Hoffmann | |
| 2014/0214756 A1* | 7/2014 | Nordback ......... | G06F 17/30011 707/608 |
| 2015/0223008 A1 | 8/2015 | Watson et al. | |
| 2015/0261428 A1* | 9/2015 | Ewe .................. | G06F 8/38 715/747 |
| 2016/0077901 A1* | 3/2016 | Roth ................. | G06F 9/45529 719/328 |
| 2016/0261671 A1* | 9/2016 | AbiEzzi ............. | H04L 67/025 |

OTHER PUBLICATIONS

"Create and Run an App in Minutes with the AppBuilder Windows Client", Published on: Jan. 30, 2014, 1 page Available at: http://docs.telerik.com/platform/appbuilder/getting-started/app-in-minutes-with-windows-client.

"Empowering the Business to Configure "Ready to Run" Apps in Real Time With no Custom Code", Published on: Apr. 21, 2015, 2 pages Available at: http://forms.kony.com/rs/konysolutions/images/DS-Kony-Modeler.pdf.

"Create and Run an App in Minutes with the AppBuilder In-Browser Client", Published on: Mar. 20, 2015, 1 page Available at: http://docs.telerik.com/platform/appbuilder/getting-started/app-in-minutes-with-inbrowser-client.

\* cited by examiner

CREATING AND MODIFYING APPLICATIONS FROM A MOBILE DEVICE

BACKGROUND

Creating an executable computer program often requires a broad range of expertise. For example, creating an executable computer program generally involves generating algorithms, verifying a correctness of the algorithms, and implementing the algorithms into a programming language. A developer may add code to provide application data access at runtime. This often requires developer skills in writing the code that affects the application data access at runtime. In addition, developers typically have limited control over storage locations for an application, with the storage location frequently dictated by the developer environment. When compared to desktop computers, mobile devices (e.g., a mobile telephone, a smartphone, a phablet, a tablet) generally have fewer local resources (e.g., slower processing speed, less memory, smaller screen size). Using a conventional mobile device to create and/or modify an executable computer program may be tedious and/or time consuming. However, at least some users increasingly use mobile devices due to their relative convenience and/or increased connectivity.

SUMMARY

Examples of the disclosure provide systems and methods for modifying an application from a mobile device. In some examples, a document is presented at a mobile device. The document may be included in an application. An instruction to modify the application is received at the mobile device, and it is determined at the mobile device whether the received instruction is associated with a first type of modification and/or a second type of modification. In response to determining that the received instruction is associated with the first type of modification, a local instance of the document stored at the mobile device is modified at the mobile device. In response to determining that the received instruction is associated with the second type of modification, a remote instance of the document stored at a server device is modified at the server device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
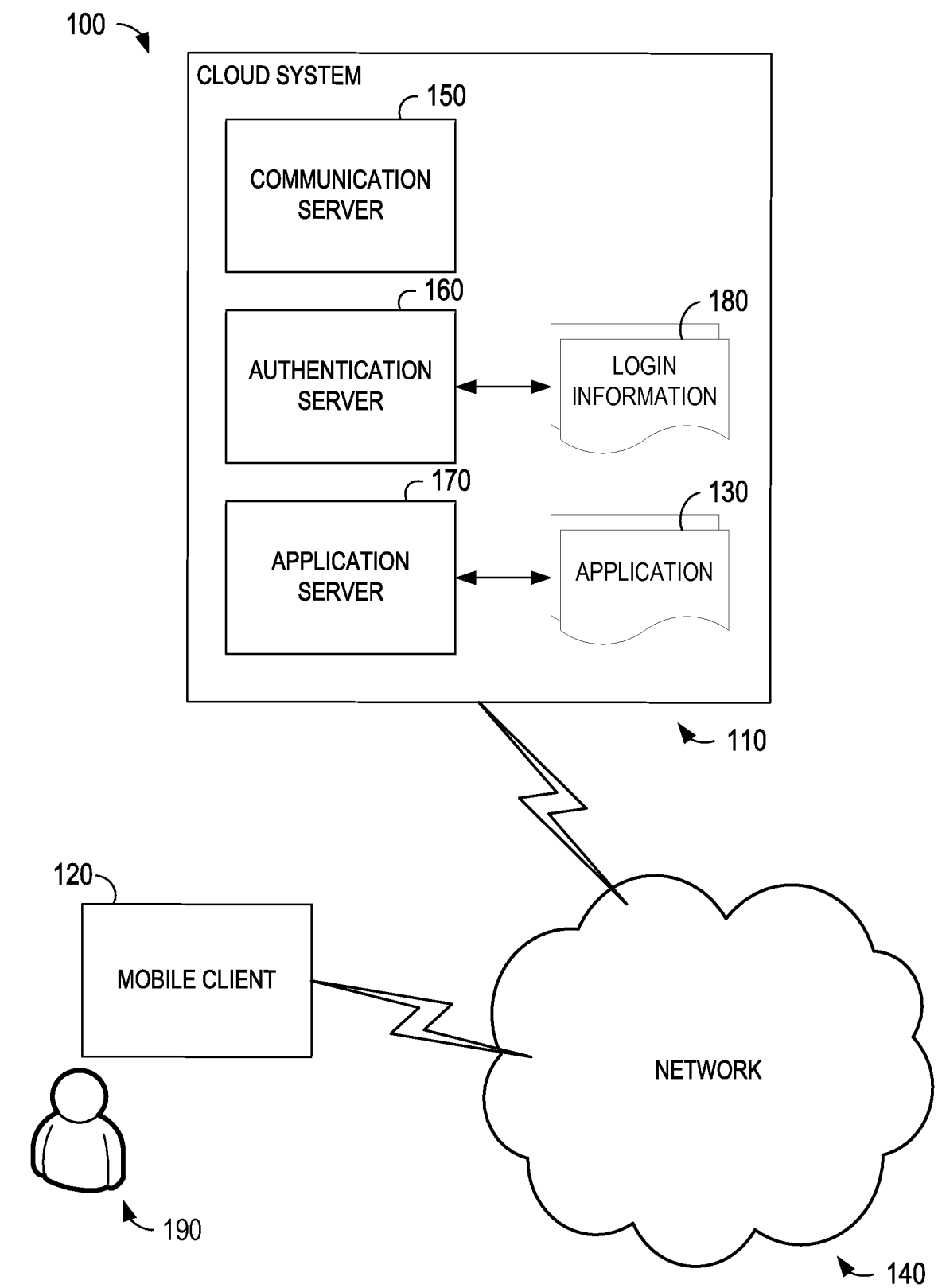
FIG. 1 is a block diagram of an example environment including a mobile client coupled to a cloud system.

The subject matter described herein is related generally to document modification and, more particularly, to modifying an application including one or more documents from a mobile device. As described herein, a mobile device may refer to any mobile computing device including, without limitation, a mobile telephone, a smartphone, a phablet, a tablet, a portable media player, or a netbook. For example, a mobile device may include any computing device that includes a portable power supply (e.g., a battery). In some examples, one or more operations are executed or implemented while resources associated with the mobile device are managed. At least some operations may be implemented at the mobile device while other operations may be implemented at a server device communicatively coupled to the mobile device. For example, the mobile device may determine whether an instruction to modify a document is associated with a first type of modification and/or a second type of modification. If the instruction is associated with the first type of modification, an instance of the document stored at the mobile device is modified. On the other hand, if the instruction is associated with the second type of modification, an instance of the document stored at the server device is modified.

The examples described herein determine whether to implement at least some operations locally or remotely to facilitate managing local resources. For example, the examples described herein may implement one or more operations based on whether an instruction is associated with a first type of modification and/or a second type of modification. The examples described herein may be implemented using computer programming or engineering techniques including computing software, firmware, hardware, or a combination or subset thereof. Aspects of the disclosure enable documents, applications, and/or packages to be generated and/or modified in an efficient and effective manner for increased performance. For example, a first user instruction associated with a first type of modification may be implemented locally at a mobile device. On the other hand, a second user instruction associated with a second type of modification may be implemented remotely at a server device. In such examples, a change or manipulation may be strategically implemented at a mobile device and/or a server device to facilitate managing computational, processing, memory, and/or temporal resources.

The examples described herein manage one or more operations or computations associated with generating and/or modifying a package, an application and/or a document. By generating and/or modifying packages, applications, and/or documents in the manner described in this disclosure, some examples reduce processing load and/or increase processing speed by strategically managing computational, processing, memory, and/or temporal resources. The net effect of the management process improves performance of the mobile device and/or the server device in hosting a package, application, and/or document. Additionally, some examples may conserve memory, reduce network bandwidth usage, improve operating system resource allocation, and/or improve communication between computing devices by streamlining at least some operations, improve user efficiency and/or user interaction performance via user interface interaction, and/or reduce error rate by automating at least some operations.

Moreover, aspects of the disclosure provide a developer environment that any user, regardless of development experience or lack thereof, may utilize to create and/or modify a package, application, and/or document. General workplace computing skills may be translatable by a mobile device into computing coding or program development skills. Because the applications are generated and/or modified automatically from templates and source data, they further increase efficiency of a developer or user in development and/or modification of an application. In addition, the development environment is translated to a non-developer user in such a way as to provide application development for any user, increasing the speed of application development for the user.

For example, a template including a data schema and a set of data for the template may be received. The set of data may be bound to the template (e.g., the template may be populated) based on the data schema. A package, application, and/or document may be generated and/or modified without having to write code, thereby providing increased user interface functionality, in addition to bringing developer capabilities to a non-developer for generating and/or modifying packages, applications, and/or documents.

FIG. 1 is a block diagram of an example environment 100 including a cloud system 110 and a mobile device or mobile client 120 coupled to the cloud system 110. The mobile client 120 may, for example, communicate with the cloud system 110 to generate and/or modify one or more applications or "apps" 130 (e.g., web app, mobile app, logic app, application programming interface (API) app). In some examples, the environment 100 includes one or more cloud systems 110, and the mobile client 120 may be coupled to the one or more cloud systems 110 via one or more networks 140. Example networks 140 include a personal area network, a local area network, a wide area network, a cellular or mobile network, and the Internet. Alternatively, the network 140 may be any communication medium that enables the cloud system 110 to communicate with the mobile client 120 and/or with another cloud system 110.

The cloud system 110 is configured to perform one or more operations. For example, the cloud system 110 may include and/or have access to a communication server 150, an authentication server 160, and/or an application server 170. In some examples, the communication server 150 is configured to control communication (e.g., data flow) between one or more computing devices (e.g., cloud system 110, communication server 150, authentication server 160, application server 170) and the mobile client 120. Communication between the one or more computing devices and the mobile client 120 may occur using any protocol or mechanism over any wired or wireless connection. For example, the one or more computing devices may communicate with the mobile client 120 via the network 140.

The mobile client 120 may initiate a request to the cloud system 110 (e.g., via the communication server 150) to generate, modify, and/or access one or more applications 130 hosted on and/or by the cloud system 110. For example, the mobile client 120 may access data associated with the cloud system 110 to perform one or more operations. In some examples, the authentication server 160 is configured to manage, store, and/or have access to registered login information 180 (e.g., identification, password), and, based on the registered login information 180, determine whether the mobile client 120 or a user 190 associated with the mobile client 120 is authorized to access data associated with the cloud system 110. For example, the registered login information 180 may be associated with a registered mobile client and/or a registered user authorized to access data associated with the cloud system 110 (e.g., a whitelist). Additionally or alternatively, the registered login information 180 may be associated with a registered mobile client and/or a registered user not authorized to access data associated with the cloud system 110 (e.g., a blacklist).

The authentication server 160 may receive user input (e.g., identification, password) from the mobile client 120 (e.g., via the communication server 150), and compare the received user input with the registered login information 180 to determine whether the mobile client 120 or user 190 is authorized to access data associated with the cloud system 110. For example, upon determining that the received user input matches or corresponds to registered login information 180 associated with a whitelist, the authentication server 160 determines that the mobile client 120 is authorized to access data associated with the cloud system 110 and selectively allows the mobile client 120 to access data associated with the cloud system 110. On the other hand, upon determining that the received user input matches or corresponds to registered login information 180 associated with a blacklist or does not match or correspond to registered login information 180, the authentication server 160 determines that the mobile client 120 is not authorized to access data associated with the cloud system 110 and selectively restricts the mobile client 120 from accessing data associated with the cloud system 110.

The authentication server 160 may transmit a security token (e.g., single sign-on (SSO) token, reduced sign-on (RSO) token) to the mobile client 120 (e.g., via the communication server 150). The security token is configured to allow the mobile client 120 to access data associated with one or more computing devices (e.g., cloud system 110, communication server 150, authentication server 160, application server 170) without providing user input for each computing device. In some examples, the mobile client 120 and/or user 190 may be authorized to access (or restricted from accessing) one or more computing devices and/or perform one or more operations based on a role associated with the mobile client 120 and/or user 190 (e.g., administrator, author, user, writer, reader, parent, child).

In some examples, the application server 170 is configured to manage and/or store one or more applications 130 and communicate with the mobile client 120 (e.g., via the communication server 150) to allow the user 190 to generate, modify, and/or access one or more applications 130 using the mobile client 120. The application 130 may be configured to perform one or more operations and may include any combination of computing software, firmware, hardware, or a combination or subset thereof. For example, the application 130 may be configured to present an image or a series of images (e.g., a video) on a display, play audio, and/or send a service call to access data associated with another computing device (e.g., cloud system 110).

An application 130, when executed by a processor, operates to perform a functionality. An application 130 may communicate with other applications or services, such as web services accessible via the network 140. For example, an application 130 may represent a downloaded client-side application that corresponds to server-side services executing at the cloud system 110. In some examples, applications 130 may be configured to communicate with the cloud system 110 during runtime, or may share and/or aggregate data between client-side services and cloud services.

Figure 2:
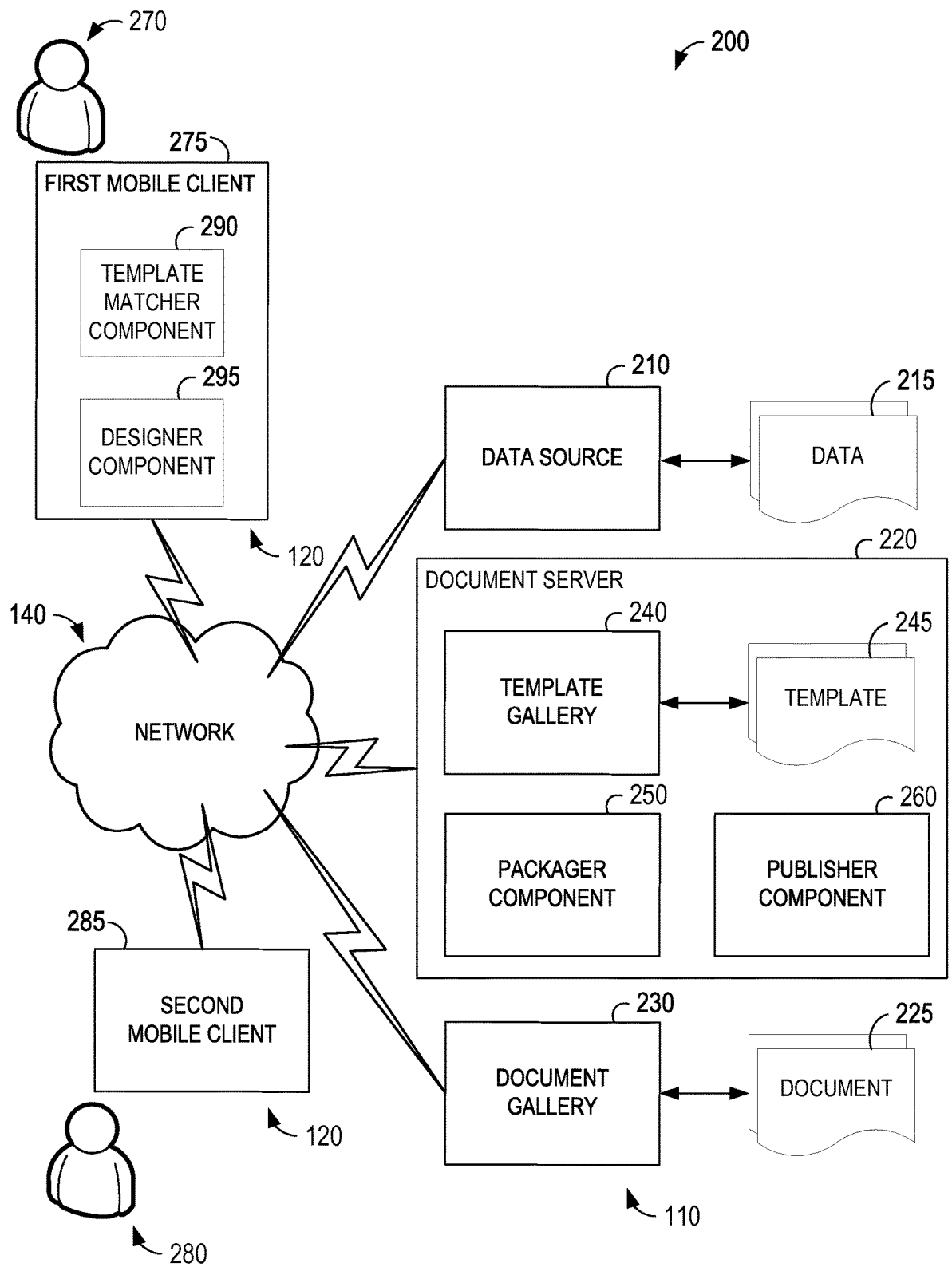
FIG. 2 is a block diagram of an example environment in which an application may be generated and/or modified.

FIG. 2 is a block diagram of an example environment 200 in which one or more applications 130 (shown in FIG. 1) may be generated and/or modified. In some examples, the environment 200 includes one or more cloud systems 110. Example cloud systems 110 include a data source 210 configured to manage and/or store data 215, a document server 220 (e.g., application server 170) configured to generate and/or modify one or more documents 225, and/or a document gallery 230 configured to manage and/or store one or more documents 225. A cloud system 110 may include any combination of components that enables the cloud system 110 to function as described herein.

An application 130 includes one or more documents 225 that are generated and/or modified based on data 215. The data 215 may be associated with a data schema. For example, the data 215 may be formatted as spreadsheet data and arranged in one or more rows and one or more columns. Data 215 may include one or more of user data, remote data, shared data, enterprise data, public data, dynamic data, local data, or any other accessible data.

The document server 220 may include, for example, a template gallery 240 configured to host one or more templates 245, a packager component 250 configured to generate a package (e.g., an application 130) including one or more documents 225, and/or a publisher component 260 configured to publish one or more packages or applications 130. An application 130, for example, may be generated by extracting data 215, and populating a template 245 with the data 215. Additionally or alternatively, an application 130 may be published by transmitting a data-populated template 245 to the document gallery 230.

The template gallery 240 is configured to manage and/or store one or more templates 245 and/or metadata associated with the templates 245. A template 245 may be selected or used in application design. Example templates 245 may include application templates for, without limitation, asset management applications, catalog applications, contract applications, customer relationship management (CRM) applications, dashboard and report applications, events and calendars applications, timesheet applications, expense tracking and/or reporting applications, media applications, multi-media applications, personal management applications, travel applications, project management applications, and so on.

Various templates 245 may provide different visual layout options or different data exposure components. In some examples, each template 245 may be associated with a respective template schema. For example, a template 245 may include one or more template fields that may be associated with a predetermined configuration (e.g., type, size) of data 215. Data 215 may be mapped to the template 245 in accordance with the template schema. In some examples, the template gallery 240 may have one or more representations of the templates 245 that may be customized via user interaction. A template 245 may be associated with an identifier (e.g., a templateID) that uniquely identifies the template 245.

The packager component 250 is configured to generate a package (e.g., an application 130) including one or more documents 225. For example, the packager component 250 may retrieve or receive, from the data source 210, data 215, retrieve or receive, from the template gallery 240, a template 245, and populate the template 245 with the data 215 to generate at least a portion of the package. In at least some examples, the packager component 250 updates a connection string associated with a data source 210.

The packager component 250 may transmit the package to the publisher component 260, which is configured to generate a compiled version of the package. The publisher component 260 is configured to communicate with the document gallery 230 such that the documents 225 associated with the package are available for retrieval (e.g., via download) by a mobile client 120. In at least some examples, a document representation may be compiled into compiled script representations that may be processed by a mobile client 120. Once a compiled application 130 is transmitted to a mobile client 120, the mobile client 120 may initialize an application host container component to host the application 130. The application 130 may run inside the mobile client 120, on which a user is able to interact with the application 130.

A first user 270, for example, may operate or use a first mobile client 275 (e.g., mobile client 120) to access one or more cloud systems 110. For example, the first mobile client 275 may retrieve an application 130, and present a document 225 included in the application 130 to a first user 270. In at least some examples, the first mobile client 275 may be used to generate one or more documents 225. For example, the first mobile client 275 may communicate with the data source 210, the document server 220, and/or the document gallery 230 via the network 140. In some examples, the first mobile client 275 may retrieve data 215 from the data source 210, retrieve a template 245 from the document server 220, and/or populate the document template 245 with the data 215 to generate a document 225. The first mobile client 275 may transmit the generated document 225 to the document gallery 230 such that the generated document 225 is available for retrieval (e.g., via download) by another computing device (e.g., a mobile client 120).

In some examples, the document server 220 and/or the document gallery 230 may include or be coupled to an authentication server 160 that determines whether a mobile client or a user associated with the mobile client is authorized to retrieve the document 225. Additionally or alternatively, the authentication server 160 may be used to determine a level of authorization (e.g., a role) granted to the mobile client and/or the user. For example, the first user 270 and/or first mobile client 275 may be associated with an author role (e.g., a role with edit permissions), which is authorized to generate and/or modify a document 225. On the other hand, a second user 280 and/or a second mobile client 285 may be associated with a reader role (e.g., a role with read permissions), which is authorized to access and/or view the document 225 but not generate and/or modify the document 225.

In some examples, the first mobile client 275 may allow the first user 270 to select a data source 210 from which to retrieve data 215 such that a document 225 may be generated and/or modified. In at least some examples, the data source 210 may include or be coupled to an authentication server 160 that determines whether the first mobile client 275 or the first user 270 is authorized to access the data 215. To identify one or more data sources 210 from which data 215 is retrievable, the first mobile client 275 may generate a service request to get one or more available connections (e.g., data sources 210). Additionally or alternatively, the first mobile client 275 may generate a service request to get a desired connection. In some examples, the first mobile client 275 is configured to retrieve or receive a connection string and/or metadata from the data source 210.

Figure 3:
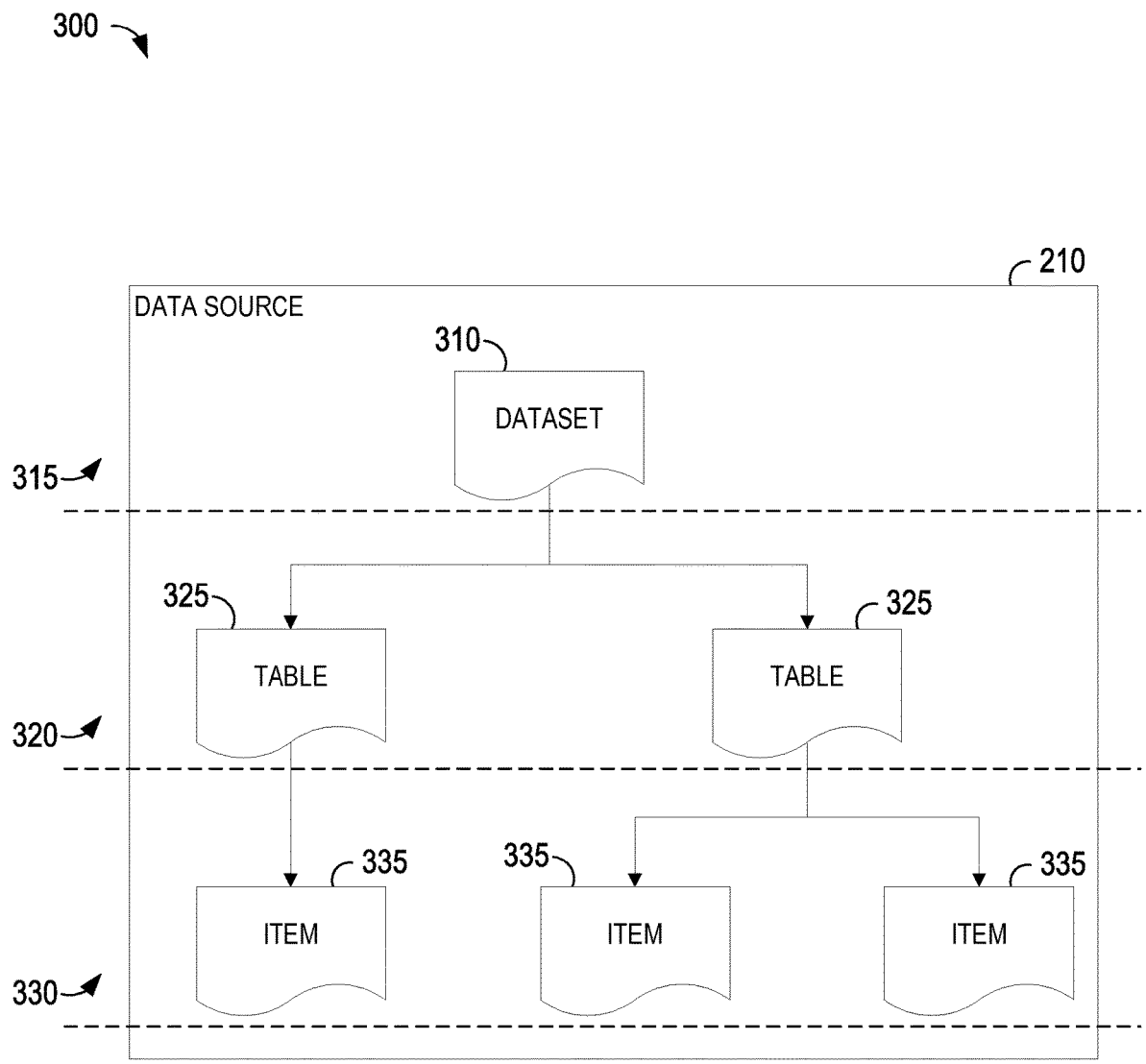
FIG. 3 is a relationship diagram of an example dataset.

Upon coupling the first mobile client 275 with a data source 210, the first mobile client 275 may be used to access and/or navigate a desired resource (e.g., file, list) managed and/or stored at the data source 210. As shown in FIG. 3, the data source 210 may manage and/or store one or more resources, such as a dataset 310. The dataset 310 may have any schema that enables the dataset 310 to function as described herein. For example, the dataset 310 may include one or more elements that are arranged in one or more hierarchical levels. In some examples, the first mobile client 275 is configured to retrieve data by navigating and/or traversing the dataset 310 at and/or across a dataset level 315 including one or more datasets 310, a table level 320 including one or more tables 325, and/or an item level 330 including one or more items 335.

Referring back to FIG. 2, the first mobile client 275 includes a template matcher component 290 that is configured to analyze the data 215 and identify a template 245 based at least on the data 215. Alternatively, the template matcher component 290 may be available in the cloud (e.g., as a standalone cloud system 110 or included in another cloud system 110).

In some examples, the template matcher component 290 is configured to periodically sync with the template gallery 240 to receive or retrieve one or more templates 245 and/or metadata associated with the templates 245. The template matcher component 290 may identify a data schema associated with the data 215, identify a template schema associated with a template 245, and/or compare the data schema with the template schema to automatically identify the template 245. For example, the template matcher component 290 may identify a device form factor and table metadata, and identify a template 245 that includes one or more template fields configured to present at least some of the data 215 in accordance with the device form factor. In some examples, the first mobile client 275 may present one or more templates 245 to the user 270, who may select a template 245 to be used in place of the template 245 automatically identified by the template matcher component 290.

In some examples, the template matcher component 290 is configured to identify an identifier associated with an identified template 245 (e.g., a templateID), generate a map between the data 215 and the template fields of the identified template 245, and/or transmit the identifier, map, and/or the connection string associated with the data source 210 to the document server 220 or, more particularly, to the packager component 250. In at least some examples, the packager component 250 may retrieve or receive, from the template gallery 240, a template 245 corresponding to the received identifier (e.g., the templateID) and populate the template 245 in accordance with the map. For example, the document server 220 may include a screen layout generator configured to generate one or more screens based on a layout associated with the template 245 and/or the data 215 associated with the data source 210.

The first mobile client 275 includes a designer component 295 that allows the first user 270 to modify and/or edit the package. In some examples, the designer component 295 presents an interactive canvas or interactive design surface to a user (e.g., first user 270). The designer component 295, for example, may receive user instruction to modify a document 225. In some examples, the document server 220 is configured to host a document 225 associated with an application 130 running on the first mobile client 275. For example, one or more documents 225 may be compiled into one or more document representations that are processed by the first mobile client 275. This enables collaboration as one or more mobile clients 120 may have access to the document representation hosted at the document server 220 and make one or more modifications to the application 130 from the mobile client 120. In at least some examples, the document server 220 may maintain a state of the document for changes that have been locally processed on the first mobile client 275.

Figure 4:
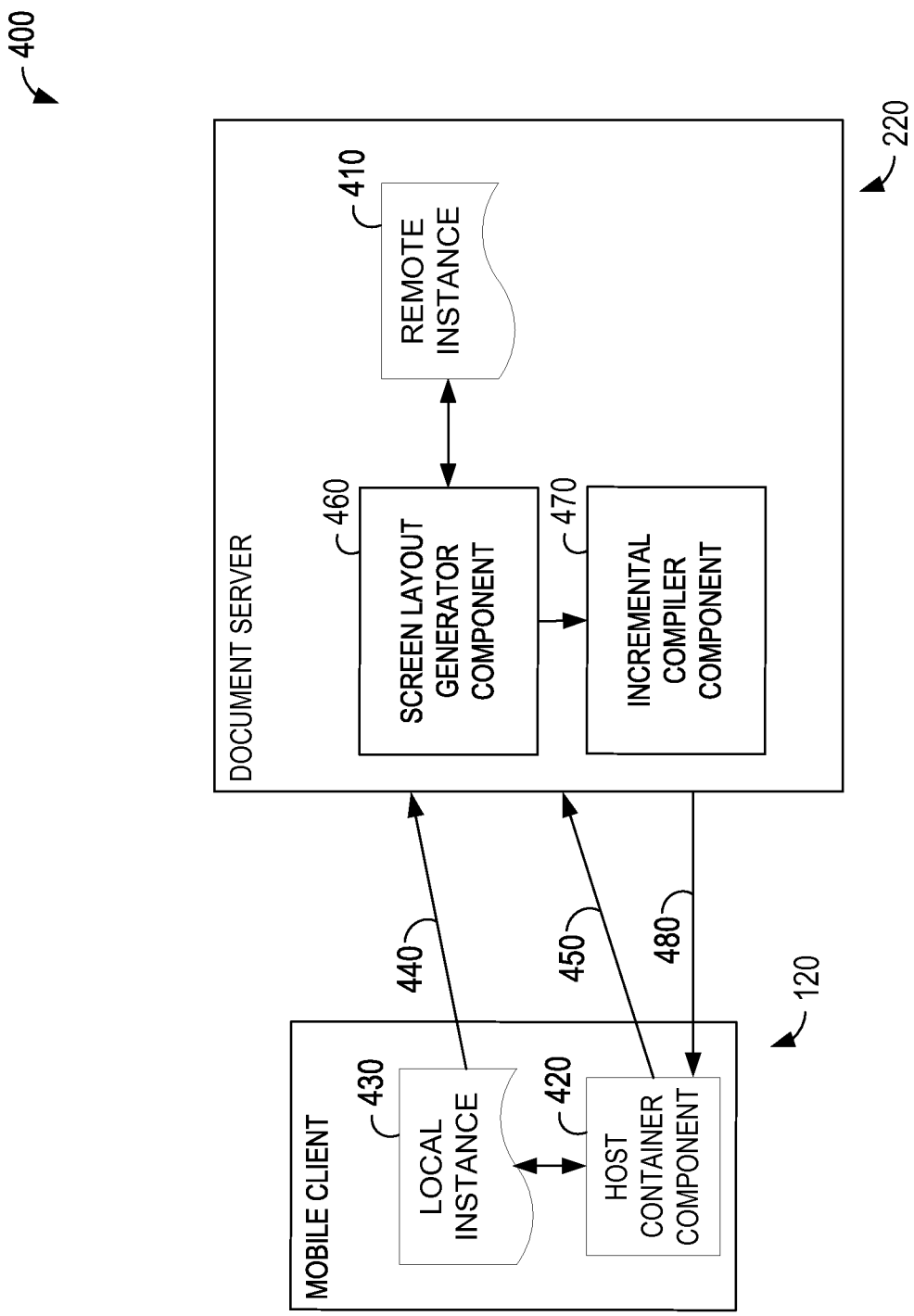
FIG. 4 is a block diagram of an example environment in which an application may be generated and/or modified.

FIG. 4 is a block diagram of an example environment 400 in which one or more applications 130 (shown in FIG. 1) may be modified locally and/or remotely. The document server 220 may support a host of operations on the document 225 and expose the operations to one or more mobile clients 120 (e.g., first mobile client 275) representing the document 225 in a document form. A remote instance 410 of the application 130 may be compiled into one or more script representations that may be processed by a mobile client 120. The remote instance 410 may be, for example, one or more documents 225 associated with a package (e.g., an application 130) hosted at the document server 220.

In some examples, the mobile client 120 may initialize a host container component 420 to host a local instance 430 of the application 130. In this manner, the application 130 may run inside the mobile client 120, on which a user is able to interact with the application 130. The local instance 430 may be, for example, one or more documents 225 associated with a package (e.g., an application 130) hosted at the mobile client 120. When a user interacts with the application 130 (via the mobile client 120), at least some interactions may be local to or self-contained on the mobile client 120. That is, the interactions may affect the local instance 430 of the application 130. For example, a local update is a modification to the local instance 430 of the application 130. Conversely, an interaction may affect the remote instance 410 of the application 130. For example, a remote update is a modification to the remote instance 410 of the application 130. For remote updates, the mobile client 120 may communicate with a cloud system 110 (e.g., the document server 220) to modify and/or update the remote instance 410 of the application 130.

The document server 220 is configured to modify and/or update the document representation. Local modifications may be recorded, analyzed, and/or processed on the mobile client 120 by, for example, leveraging local compiled rules and generating one or more calls asking the document server 220 to update a document representation. A remote modification may include leveraging an application programming interface (API) associated with the document server 220 and generating a call asking the document server 220 to modify and/or edit the package, such as transmitting one or more design changes to the document server 220. In some examples, the mobile client 120 is configured to determine whether a user instruction to modify and/or update an application 130 is associated with a first type of modification (e.g., a local modification) and/or a second type of modification (e.g., a remote modification).

An example of a local operation is theme switching or theme changing. Theme switching is achieved by a local update of the application code (e.g., the local instance 430) on the mobile client 120. The mobile client 120 may record user actions and use local compiled rules to generate a script that the application 130 executes to produce a result. In at least some examples, the mobile client 120 may issue an update request 440 to the document server 220 such that a server representation (e.g., the remote instance 410) may be updated in an asynchronous, non-blocking manner. The update to the server representation enables other mobile clients 120 listening to the document 225 to get one or more updates made on the mobile client 120.

An example of a remote operation includes switching a layout and/or a template layout change. To switch a layout, for example, the mobile client 120 receives a user selection, and the mobile client 120 generates a call 450 based on the user selection. The call 450 may be transmitted to the document server 220, for example, to remove the current layout and apply a new layout. Upon implementing the call 450, the document server 220, which maintains a state of the application 130, generates a call that updates the document representation of the application 130 at the document server 220 (e.g., remote instance 410).

In some examples, the document server 220 includes a screen layout generator component 460 configured to generate one or more screens based on a layout associated with the template 245 and/or the data 215 associated with the data source 210. Remote updates to the document 225 may be incrementally compiled at the document server 220 by an incremental compiler component 470, and changes to the package (e.g., a delta 480) may be monitored by the incremental compiler component 470. The delta 480, for example, may include one or more differences between a package before a modification and the package after the modification. The delta 480 may be transmitted to the mobile client 120. In some examples, a response back to the mobile client 120 goes through the packager component 250.

Incremental compilation of the document 225 and/or determination of the delta 480 are enabled by the mobile client 120 sending one or more server hashes of a local state of the application files. For example, when an application 130 is generated, the document server 220 may transmit a newly created package to the mobile client 120. For subsequent remote updates, the mobile client 120 may send the document server 220 a hash list associated a local state of the application files, and the document server 220 may generate an incremental package associated with one or more documents 225 incorporating changes requested by the mobile client 120. In some examples, the hash list may be used to determine one or more changes to the package (e.g., the delta 480), and the document server 220 may transmit the delta 480 to the mobile client 120, which may update a preview version of the application 130 in real time.

Figure 5:
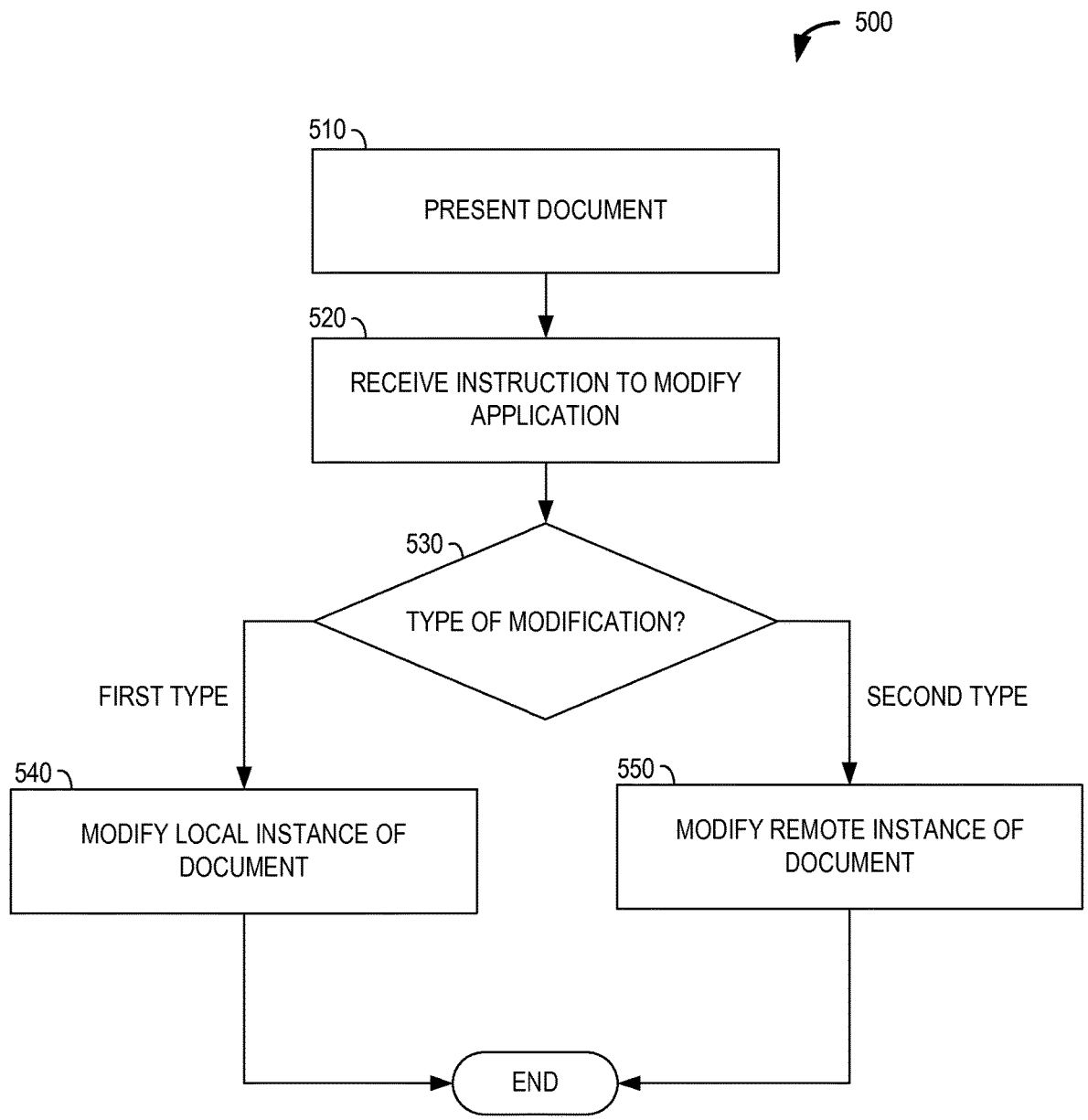
FIGS. 5 and 6 are flowcharts of an example method for modifying an application.

FIG. 5 is a flowchart of an example method 500 including a plurality of operations to modify an application 130 using a mobile client 120 (e.g., first mobile client 275). The example operations presented in FIG. 5 may be performed by one or more components described in FIG. 1, 2, or 4, for example.

At 510, a document 225 is presented at the mobile client 120. A package (e.g., an application 130) may include the document 225. An instruction to modify the application 130 is received at 520. For example, a user (e.g., first user 270) may input the instruction at the mobile client 120. At 530, it is determined whether the received instruction is associated with a first type of modification (e.g., a local modification) and/or a second type of modification (e.g., a remote modification). In response to determining that the received instruction is associated with the first type of modification, a local instance 430 of the document 225 stored at the mobile client 120 is modified at 540. Additionally or alternatively, in response to determining that the received instruction is associated with the second type of modification, a remote instance 410 of the document 225 stored at a cloud system 110 (e.g., the document server 220) is modified at 550.

Figure 6:
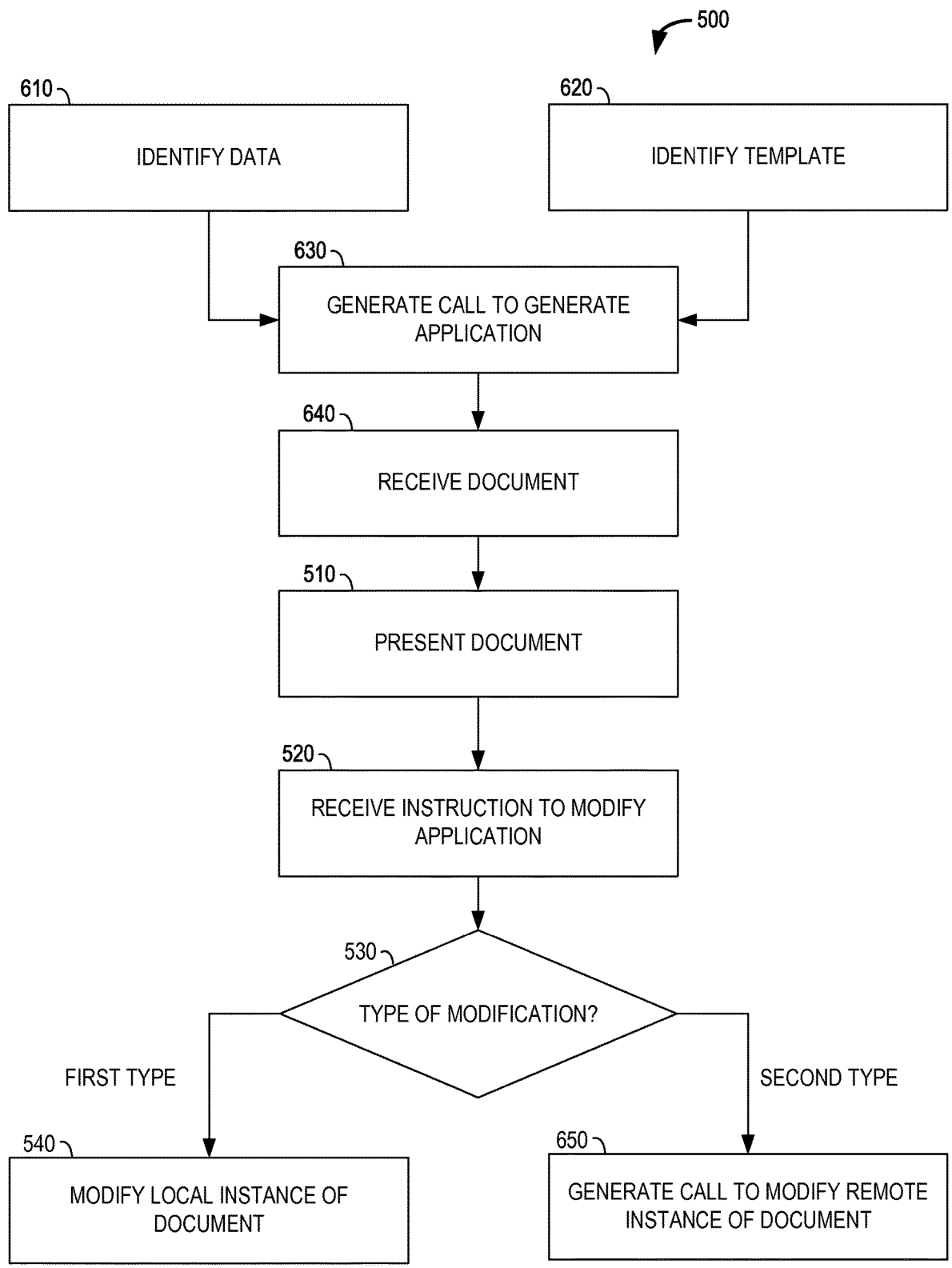

FIG. 6 is a detailed flowchart of the method 500. The example operations presented in FIG. 6 may be performed by one or more components described in FIG. 1, 2, or 4, for example.

In some examples, data 215 is identified at 610, and a template 245 is identified at 620. For example, a user (e.g., first user 270) may select a data source 210 and/or its data 215, which is analyzed by the mobile client 120, and the template 245 may be identified based on the analyzed data 215. The selection of the data 215 may be received from the user opening a file, for example. In at least some examples, data 215 may be selected from one or more data sources 210. Alternatively, the user may select a template 245, which is analyzed by the mobile client 120, and a data source 210 and/or its data 215 may be identified based on the template 245. The user may select a template 245 from a template gallery 240, for example.

At 630, a call is generated based on the identified data and the identified template to generate an application, and the call is transmitted to a cloud system 110 (e.g., the document server 220). In response to receiving the call, the document server 220 generates a package (e.g., application 130). In at least some examples, data 215 may be bound to a template 245 based on a layout schema and/or a data schema. The schema may map, for example, the data 215 to template fields of the selected template 245, for example. The document server 220 transmits the generated package to the mobile client 120, and one or more documents 225 are received from the document server 220 at 640.

At 510, a document 225 is presented at the mobile client 120. An instruction to modify the application 130 is received at 520, and the mobile client 120 determines whether the received instruction is associated with a first type of modification (e.g., a local modification) and/or a second type of modification (e.g., a remote modification) at 530. For example, an instruction associated with a theme change may be determined to be associated with the first type of modification. In at least some examples, the mobile client 120 may determine that the received instruction is associated with a theme change and, based on the determination, associate the received instruction with the first type of modification. On the other hand, an instruction associated with a template layout change may be determined to be associated with the second type of modification. In at least some examples, the mobile client 120 may determine that the received instruction is associated with a template layout change and, based on the determination, associate the received instruction with the second type of modification. An instruction associated with a data change may, for example, be determined to be associated with the first type of modification and/or the second type of modification. For example, a user may desire to update at least some data 215 locally without modifying the remote instance 410.

In some examples, a request associated with a local modification may be transmitted to the document server 220 to modify a representation of the document 225 such that the user accessing the data 215 would access a modified representation of the data 215 while another user accessing the data 215 would access an unmodified representation of the data 215 (e.g., the data 215 without the local modification). Alternatively, the user may desire to update at least some data 215 globally (e.g., locally and remotely) such that another user accessing the data 215 would access a modified representation of the data 215.

In some examples, the mobile client 120 may determine whether the received instruction is associated with a data schema change. For example, a user may desire to modify a data schema associated with a dataset 310. In response to determining that the received instruction is associated with the data schema change, the mobile client 120 may change the data schema and match the changed data schema to a template layout. Alternatively, the mobile client 120 may generate a call to the document server 220 to change the data schema and match the changed data schema to the template layout. Similarly, in some examples, the mobile client 120 may determine whether the received instruction is associated with a template layout change. For example, a user may desire to modify a template layout associated with a template 245. In response to determining that the received instruction is associated with the template layout change, the mobile client 120 may change the template layout and match the changed template layout to a data schema. Alternatively, the mobile client 120 may generate a call to the document server 220 to change the template layout and match the changed template layout to the data schema.

In response to determining that the received instruction is associated with the first type of modification, a local instance 430 of the document 225 stored at the mobile client 120 is modified at 540. Additionally or alternatively, in response to determining that the received instruction is associated with the second type of modification, a remote instance 410 of the document 225 stored at a cloud system 110 (e.g., the document server 220) is modified. For example, a call to modify a remote instance 410 of the document 225 may be generated at 650, and the call may be transmitted to the document server 220 to modify the remote instance 410 of the document 225.

Figure 7:
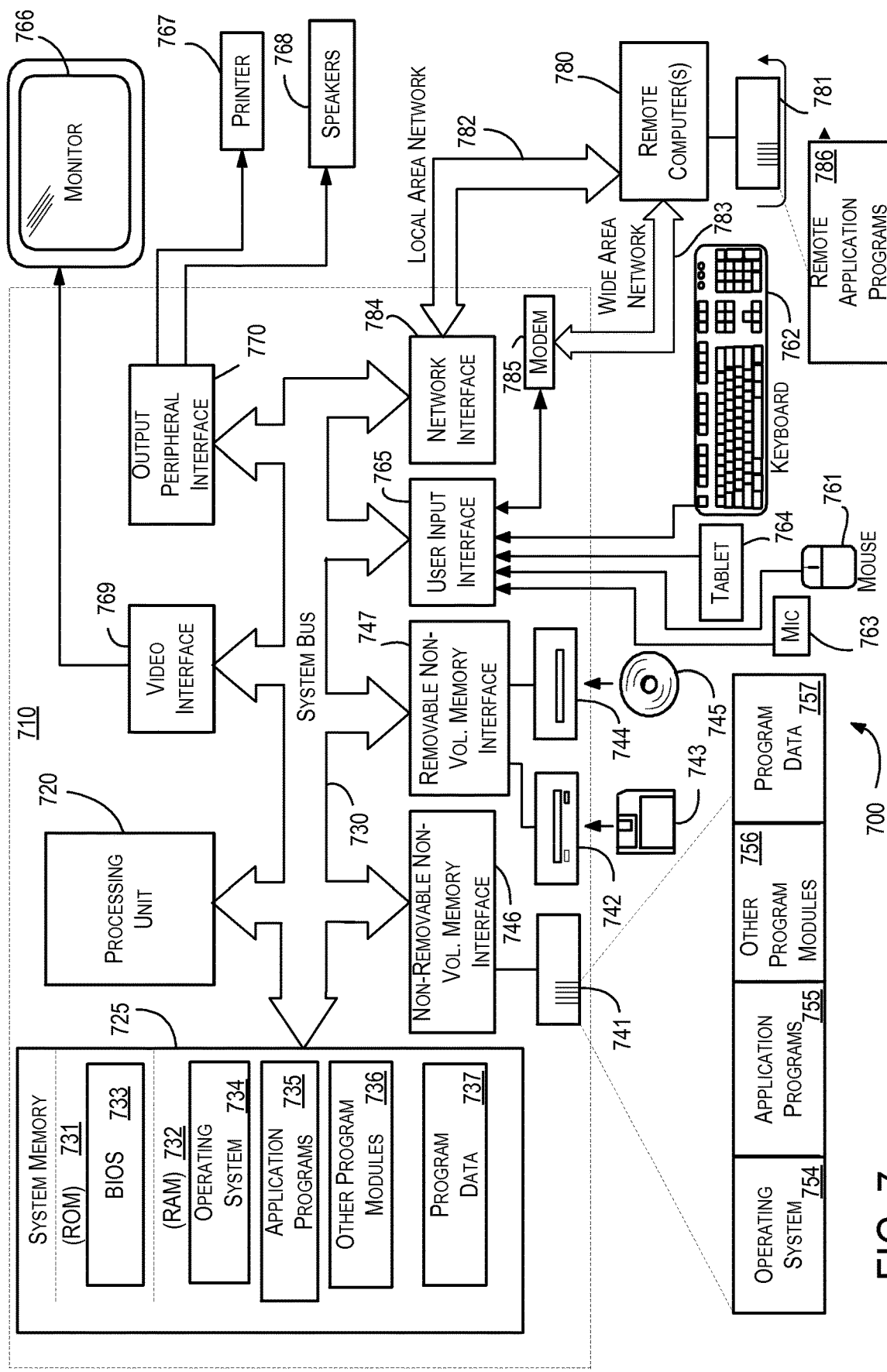
FIG. 7 is a block diagram of an example computing device that may be used to modify an application.

FIG. 7 is a block diagram of an example operating environment 700 that may be used to generate a deferrable data flow in the environment 100 (shown in FIG. 1). The operating environment 700 is only one example of a computing and networking environment and is not intended to suggest any limitation as to the scope of use or functionality of the disclosure. The operating environment 700 should not be interpreted as having any dependency or requirement relating to any one or combination of components illustrated in the example operating environment 700.

The disclosure is operational with numerous other computing and networking environments or configurations. While some examples of the disclosure are illustrated and described herein with reference to the operating environment 700 being or including a mobile client 120 (shown in FIGS. 1, 2, and 4), aspects of the disclosure are operable with any computing system or device (e.g., cloud system 110, communication server 150, authentication server 160, application server 170, data source 210, document server 220, document gallery 230, template gallery 240, packager component 250, publisher component 260, first mobile client 275, second mobile client 285, host container component 420, screen layout generator component 460, incremental compiler component 470) that executes instructions to implement the operations and functionality associated with the operating environment 700.

For example, the operating environment 700 may include a mobile device, a mobile telephone, a phablet, a tablet, a portable media player, a netbook, a laptop, a desktop computer, a personal computer, a server computer, a computing pad, a kiosk, a tabletop device, an industrial control device, multiprocessor systems, microprocessor-based systems, set top boxes, programmable consumer electronics, network computers, minicomputers, mainframe computers, distributed computing environments that include any of the above systems or devices, and the like. The operating environment 700 may represent a group of processing units or other computing devices. Additionally, any computing device described herein may be configured to perform any operation described herein including one or more operations described herein as being performed by another computing device.

With reference to FIG. 7, an example system for implementing various aspects of the disclosure may include a general purpose computing device in the form of a computer 710. Components of the computer 710 may include, but are not limited to, a processing unit 720, a system memory 725, and a system bus 730 that couples various system components including the system memory 725 to the processing unit 720. The system bus 730 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 725 includes any quantity of media associated with or accessible by the processing unit 720. For example, the system memory 725 may include computer storage media in the form of volatile and/or nonvolatile memory such as read only memory (ROM) 731 and random access memory (RAM) 732. The ROM 731 may store a basic input/output system 733 (BIOS) that facilitates transferring information between elements within computer 710, such as during start-up. The RAM 732 may contain data and/or program modules that are immediately accessible to and/or presently being operated on by processing unit 720. For example, the system memory 725 may store computer-executable instructions, communication data, authentication data, document data, and other data.

The processing unit 720 may be programmed to execute the computer-executable instructions for implementing aspects of the disclosure, such as those illustrated in the figures (e.g., FIGS. 5 and 6). By way of example, and not limitation, FIG. 7 illustrates operating system 734, document programs 735, other program modules 736, and program data 737. The processing unit 720 includes any quantity of processing units, and the instructions may be performed by the processing unit 720 or by multiple processors within the operating environment 700 or performed by a processor external to the operating environment 700.

The system memory 725 may include, for example, a template matcher component 290 and/or a designer component 295. Additionally or alternatively, the system memory 725 may include any combination of a packager component 250, a publisher component 260, a host container component 420, a screen layout generator component 460, and/or an incremental compiler component 470. Upon programming or execution of these components, the operating environment 700 and/or processing unit 720 is transformed into a special purpose microprocessor or machine. For example, the template matcher component 290, when executed by the processing unit 720, causes the processing unit 720 to analyze data 215, identify a template 245 based on the data 215, and transmit a request to generate a package based on the analyzed data 215 and the identified template 245; and/or the designer component 295, when executed by the processing unit 720, causes the processing unit 720 to receive a generated package, receive instruction to modify the generated package, determine whether the received instruction is associated with a first type of modification and/or a second type of modification, and modify a local instance 430 of the package and/or a remote instance 410 of the package based on the determination. Although the processing unit 720 is shown separate from the system memory 725, embodiments of the disclosure contemplate that the system memory 725 may be onboard the processing unit 720 such as in some embedded systems.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 742 that reads from or writes to a removable, nonvolatile magnetic disk 743 (e.g., a floppy disk, a tape cassette), and an optical disk drive 744 that reads from or writes to a removable, nonvolatile optical disk 745 (e.g., a compact disc (CD), a digital versatile disc (DVD)). Other removable/non-removable, volatile/nonvolatile computer storage media that may be used in the example operating environment include, but are not limited to, flash memory cards, digital video tape, solid state RAM, solid state ROM, and the like. The hard disk drive 741 may be connected to the system bus 730 through a non-removable memory interface such as interface 746, and magnetic disk drive 742 and optical disk drive 744 may be connected to the system bus 730 by a removable memory interface, such as interface 747.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 754, document programs 755, other program modules 756 and program data 757. Note that these components may either be the same as or different from operating system 734, document programs 735, other program modules 736, and program data 737. Operating system 754, document programs 755, other program modules 756, and program data 757 are given different numbers herein to illustrate that, at a minimum, they are different copies.

The computer 710 includes a variety of computer-readable media. Computer-readable media may be any available media that may be accessed by the computer 710 and includes both volatile and nonvolatile media, and removable and non-removable media.

By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 731 and RAM 732 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 710. Computer storage media are implemented in hardware and exclude carrier waves and propagated signals. Any such computer storage media may be part of computer 710.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer 710 through one or more input devices, such as a pointing device 761 (e.g., mouse, trackball, touch pad), a keyboard 762, a microphone 763, and/or an electronic digitizer 764 (e.g., tablet). Other input devices not shown in FIG. 7 may include a joystick, a game pad, a controller, a satellite dish, a camera, a scanner, an accelerometer, or the like. These and other input devices may be coupled to the processing unit 720 through a user input interface 765 that is coupled to the system bus 730, but may be connected by other interface and bus structures, such as a parallel port, game port or a universal serial bus (USB).

Information, such as text, images, audio, video, graphics, alerts, and the like, may be presented to a user via one or more presentation devices, such as a monitor 766, a printer 767, and/or a speaker 768. Other presentation devices not shown in FIG. 7 may include a projector, a vibrating component, or the like. These and other presentation devices may be coupled to the processing unit 720 through a video interface 769 (e.g., for a monitor 766 or a projector) and/or an output peripheral interface 770 (e.g., for a printer 767, a speaker 768, and/or a vibration component) that are coupled to the system bus 730, but may be connected by other interface and bus structures, such as a parallel port, game port or a USB. In some examples, the presentation device is integrated with an input device configured to receive information from the user (e.g., a capacitive touch-screen panel, a controller including a vibrating component). Note that the monitor 766 and/or touch screen panel may be physically coupled to a housing in which the computer 710 is incorporated, such as in a tablet-type personal computer.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 782 and one or more wide area networks (WAN) 783, but may also include other networks. Such networking environments are commonplace in offices, enterprise-wide computer networks, intranets and the Internet.

When used in a LAN networking environment, the computer 710 is coupled to the LAN 782 through a network interface or adapter 784. When used in a WAN networking environment, the computer 710 may include a modem 785 or other means for establishing communications over the WAN 783, such as the Internet. The modem 785, which may be internal or external, may be connected to the system bus 730 via the user input interface 765 or other appropriate mechanism. A wireless networking component such as comprising an interface and antenna may be coupled through a suitable device such as an access point or peer computer to a LAN 782 or WAN 783. In a networked environment, program modules depicted relative to the computer 710, or portions thereof, may be stored in the remote memory storage device. By way of example, and not limitation, FIG. 7 illustrates remote document programs 786 as residing on memory storage device 781. It may be appreciated that the network connections shown are examples and other means of establishing a communications link between the computers may be used.

The block diagram of FIG. 7 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 7 may be performed by other elements in FIG. 7, or an entity (e.g., processor, web service, server, documents, computing device, etc.) not shown in FIG. 7.

The subject matter described herein enables a computing device to determine whether to implement an operation locally at a mobile device or remotely at a server device. For example, one or more operations may be implemented locally and/or remotely based on whether an instruction is associated with a first type of modification and/or a second type of modification. In this way, the mobile device may be configured to manage local resources while enabling a user to generate and/or modify a package, application, and/or document in an efficient and effective manner.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. Examples of the disclosure may also be practiced in distributed computing environments where tasks are performed by remote processing devices that are linked through a communications network. In a distributed computing environment, program modules may be located in local and/or remote computer storage media including memory storage devices.

The examples illustrated and described herein as well as examples not specifically described herein but within the scope of aspects of the disclosure constitute example means for modifying a package, application, and/or document using a mobile device or mobile client. For example, the elements illustrated in FIGS. 1, 2, 4, and/or 7, such as when encoded to perform the operations illustrated in FIGS. 5 and 6 constitute at least an example means for presenting a package, application, and/or document, an example means for determining whether an instruction is associated with a first type of modification and/or a second type of modification, an example means for modifying a local instance of a package, application, and/or document, and/or an example means for modifying a remote instance of a package, application, and/or document.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

analyzing data;
identifying a template based on data;
analyzing a template;
identifying data based on a template;
transmitting a request to generate a package based on data and a template;
receiving a package,
presenting a document;
receiving an instruction to modify an application;
determining whether an instruction is associated with a first type of modification and/or a second type of modification;
determining whether an instruction is associated with a data schema change;
determining whether an instruction is associated with a template layout change;
determining whether an instruction is associated with a theme change;
associating an instruction with a first type of modification;
determining whether an instruction is associated with a template layout change;
associating an instruction with a second type of modification;
modifying a local instance of a document stored at a mobile device;
modifying a remote instance of a document stored at a server device;

generating a call to modify a remote instance of a document;
changing a data schema;
matching a data schema to a template layout;
changing the template layout;
matching a template layout to a data schema; and
transmitting a request to modify a representation of a document.

In some examples, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A computer-implemented method providing for a distributed application development environment, the method comprising:
storing, at a mobile device, a local instance of an application, wherein the application comprises compiled script that is executed by the application;
running, by a processor of the mobile device, the local instance of the application;
receiving, at the mobile device via an application designer component of the distributed application development environment, an instruction to modify the application;
determining, at the mobile device, whether the received instruction is associated with at least one of a first type of modification or a second type of modification;
in response to determining that the received instruction is associated with the first type of modification, modifying, at the mobile device, the local instance of the application stored at the mobile device at least by
generating, by the processor of the mobile device, a script that the local instance of the application executes, and
executing the generated script by the local instance of the application that produces a modified local instance of the application; and
in response to determining that the received instruction is associated with the second type of modification:
transmitting the received instruction to a server device to modify a remote instance of the application stored at the server device,
receiving, at the mobile device, compiled script representations of the application as modified,
storing, at the mobile device, the received compiled script representations of the application as modified as the modified local instance of the application, and
running, by the processor of the mobile device, the modified local instance of the application.

2. The computer-implemented method of claim 1, wherein the received instruction is associated with a theme change, the first type of modification including the theme change.

3. The computer-implemented method of claim 1, wherein determining whether the received instruction is associated with at least one of the first type of modification or the second type of modification comprises:
determining whether the received instruction is associated with a data schema change; and
in response to determining that the received instruction is associated with the data schema change, changing a data schema and matching the changed data schema to a template layout.

4. The computer-implemented method of claim 1, wherein the received instruction is associated with a data change, the first type of modification including the data change.

5. The computer-implemented method of claim 1, further comprising presenting a document included in the application.

6. The computer-implemented method of claim 1, wherein the received instruction is associated with a template layout change, the second type of modification including the template layout change.

7. The computer-implemented method of claim 1, wherein determining whether the received instruction is associated with at least one of the first type of modification or the second type of modification comprises:
determining whether the received instruction is associated with a template layout change; and
in response to determining that the received instruction is associated with the template layout change, changing a template layout and matching the changed template layout to a data schema.

8. The computer-implemented method of claim 1, wherein the received instruction is associated with a data change, the second type of modification including the data change.

9. A computing device comprising:
a memory that stores:
computer-executable instructions, and
a local instance of an application; and
a processor that executes the computer-executable instructions to:
receive, from a remote data management source, a dataset including a data schema that controls navigation of the dataset,
analyze the received dataset, wherein the analysis identifies the data schema of the received dataset;
select a template based on the received data and the identified data schema;
generate a map between the received dataset and the selected template based on the identified data schema;
transmit, to a remote application server, a request to generate a package based on the received dataset, the selected template, and the map as generated;
receive the package as generated from the remote application server, the package including the application, the application stored as the local instance in the memory;
run the local instance of the application;
receive an instruction to modify the application;
determine whether the received instruction is associated with at least one of a first type of modification or a second type of modification;
in response to determining that the received instruction is associated with the first type of modification;
modify the local instance of the application, and
run the modified local instance of the application; and
in response to determining that the received instruction is associated with the second type of modification:
generate a call to transmit the received instruction to the remote application server to modify a remote instance of the application;

receive compiled script representations of a modified application from the remote application server;
store the received compiled script representations of the modified application as a modified local instance of the application in the memory; and
run the modified local instance of the application.

10. The computing device of claim 9, wherein the processor is configured to execute the computer-executable instructions to:
determine whether the received instruction is associated with a theme change; and
in response to determining that the received instruction is associated with the theme change, associate the received instruction with the first type of modification.

11. The computing device of claim 9, wherein the processor is configured to execute the computer-executable instructions to present a document included in the application.

12. The computing device of claim 9, wherein the processor is configured to execute the computer-executable instructions to:
determine whether the received instruction is associated with a template layout change; and
in response to determining that the received instruction is associated with the template layout change, associate the received instruction with the second type of modification.

13. The computing device of claim 9, wherein the processor is configured to execute the computer-executable instructions to match a template layout to a data schema.

14. A system comprising:
a local memory;
a processor locally coupled to the local memory;
a template matcher component, implemented on the local memory and executed by the processor, configured to:
analyze a dataset received from a remote data management source, the dataset including a data schema that controls navigation of the dataset,
based at least on the analysis, identify the data schema associated with the dataset,
select a template based on the identified data schema,
generate a map between the received dataset and the selected template based on the identified data schema, and
transmit, to a remote application server a, a request to generate a package based on the received dataset, the selected template, and the generated map; and
a designer component, implemented on the local memory and executed by the processor, configured to:
receive, from the application server, the package, which includes an application comprising compiled script that is executed by the application,
store the application as a local instance of the application in the local memory,
run the local instance of the application,
receive user instruction to modify the received application,
determine whether the received user instruction is associated with at least one of a first type of modification or a second type of modification, and
in response to determining that the received instruction is associated with the first type of modification, modify the local instance of the application, store the modified local instance of the application in the local memory, and run the modified local instance of the application by the processor.

15. The system of claim 14, wherein the designer component is configured to determine that the received instruction is associated with a theme change, and associate the received user instruction with the first type of modification.

16. The system of claim 14, wherein the designer component is configured to determine that the received instruction is associated with a data schema change, change the data schema associated with the analyzed data, and match the changed data schema to a template layout.

17. The system of claim 14, wherein the processor is configured to present a document included in the package.

18. The system of claim 14, wherein the designer component is configured to determine that the received instruction is associated with a template layout change, and associate the received user instruction with the second type of modification.

19. The system of claim 14, wherein the designer component is configured to determine that the received instruction is associated with a template layout change, change a template layout associated with the identified template, and match the changed template layout with another data schema.

20. The system of claim 14, wherein the designer component is configured to determine that the received instruction is associated with a data change, and determine whether the data change is associated with at least one of the first type of modification or the second type of modification.

* * * * *